(12) United States Patent
Schlesser

(10) Patent No.: US 7,290,485 B2
(45) Date of Patent: Nov. 6, 2007

(54) METHOD FOR RE-HYDRATING DRY CROP WITH STEAM DURING THE BALING PROCESS

(75) Inventor: Walter Mark Schlesser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 220 days.

(21) Appl. No.: 11/152,907

(22) Filed: Jun. 15, 2005

(65) Prior Publication Data

US 2006/0283166 A1    Dec. 21, 2006

(51) Int. Cl.
*B30B 15/20*    (2006.01)
(52) U.S. Cl. ........................................... 100/74

(58) Field of Classification Search ................. 100/74, 100/73, 35, 38; 122/36, 403.6; 47/1.7; 131/290, 131/300, 318; 56/10.2 B, 16.4 R, 341
See application file for complete search history.

(56) References Cited

U.S. PATENT DOCUMENTS

| | | | | |
|---|---|---|---|---|
| 4,030,244 A | * | 6/1977 | Tennes et al. | ............... 47/1.7 |
| 4,810,446 A | * | 3/1989 | Sylvest | ....................... 264/122 |
| 4,873,772 A | * | 10/1989 | Maher | ........................... 34/60 |
| 4,991,342 A | * | 2/1991 | Maher et al. | ................. 47/1.7 |
| 5,139,035 A | * | 8/1992 | Lasch et al. | ................ 131/299 |
| 5,758,479 A | * | 6/1998 | Staheli | .................... 56/16.4 R |
| 6,109,008 A | * | 8/2000 | Staheli | .................... 56/10.2 B |

* cited by examiner

*Primary Examiner*—Árpád Fábián Kovács

(57) ABSTRACT

A steam generator is controlled for applying steam for re-hydrating dry crop during the baling process so as to raise the temperature of the crop being treated with steam by an amount which is within a desired range known to result in bales of crop of good quality.

3 Claims, 3 Drawing Sheets

METHOD FOR RE-HYDRATING DRY CROP WITH STEAM DURING THE BALING PROCESS

FIELD OF THE INVENTION

The present invention relates to a method of re-hydrating crop using steam, and, more particularly, relates to a method for controlling the application of steam so as to create bales of good quality crop.

BACKGROUND OF THE INVENTION

The use of steam to aid in the harvesting of very dry crops has proven to be very effective. Presently, adjusting the steam application rate to effectively re-hydrate a particular crop during baling has been based more on the experience of the operator than based on science. Crop conditions, crop yield and ambient weather conditions are a few of the factors or variables which play a role in steam application/steam absorption. An accurate reliable feedback system is needed to inform the operator of what rate of steam application is needed.

Most current balers maintain constant bale density by maintaining a constant plunger force. Plunger force is maintained constant by changing the pressure the baling chamber bale chute applies to the bale as the bale is being formed. The amount of friction between the bale and the bale chute is a factor in the bale chute pressure needed to generate the desired plunger force. Since the crop's moisture content affects the amount of friction between the bale and the bale chute, bale chute pressure can be used as a rough indication of moisture content and, thus, can be used to determine the steam application rate. However, this relationship is different for different crop conditions, bale densities, crop types, ambient temperatures, etc. and is not a reliable method for determining the rate of steam application.

Present moisture sensors are inadequate for the purpose of determining proper steam application rates. These sensors have many shortcomings including:

1) the lack of accuracy needed to measure the small amount of moisture added to the crop by steaming;
2) errors due to the temperature shift the crop undergoes during steam application;
3) no compensation for the high amount of surface moisture present on the crop due to the steaming process; and
4) the fact that most moisture sensors are affected by density changes and lack compensation for the large variance in crop package density that steaming allows.

The problem to be solved then is to find an accurate measure for determining the correct steam application rate for re-hydrating dry crop.

SUMMARY OF THE INVENTION

According to the present invention, there is provided an improved method for determining the correct steam application rate during re-hydrating a dry crop to be baled.

An object of the invention is to provide a method for determining the amount of steam to be supplied by a steam generator, for re-hydrating dry crop to be baled, which is appropriate for preventing leaf loss, as occurs due to under steaming during the baling process, while avoiding a deterioration in green color during storage, as occurs due to over steaming during the baling process.

It has been discovered that the amount of steam absorbed by the crop is directly related to the change in temperature ($\Delta T$) the harvested crop undergoes from windrow or ambient temperature to its temperature after steam has been applied, but before any appreciable temperature change occurs, and that the temperature increase must be within a certain $\Delta T$ range in order to avoid leaf shatter and the creation of bales of crop having poor internal crop quality. Thus, $\Delta T$ can be measured and used to provide feedback to the operator, and/or a control system, to effect an increase or a decrease in steam application rate. Since the temperature of the crop, prior to being treated with steam, is approximately the same as ambient temperature, ambient temperature may be substituted for untreated crop temperature. Because ambient temperature may remain substantially constant for a relatively long period of time, a time in excess of one hour, for example, it may be convenient for an operator to use a temperature sensing probe at the beginning of a baling session to determine the temperature rise of the crop caused by applying steam by sticking the probe into a finished test bale in order to determine the $\Delta T$ and then, if necessary, to adjust the steam application rate of the steam generator so that the $\Delta T$ is within the desired range. Baling may continue then until the ambient temperature, or other conditions, including wind, crop yield, etc., change an amount significant enough to warrant the actual $\Delta T$ to be determined by once again sticking a probe in a bale that has just been made. Alternatively, the baler could be equipped with a non-contact temperature sensor such as an infrared, non-contact thermometer arranged for "looking" inside the baling chamber and taking the temperature of the forward face of a bale being formed inside the baling chamber. An appropriate time for taking this temperature reading would be when the bale is about half way formed and during a time following the compression of a flake or charge of crop material by the plunger after the flake or charge has been introduced into the main baling chamber by the stuffer fork. In this way, the temperature of the crop inside the bale can be determined before the temperature has declined any appreciable amount, and this temperature reading can be used alone in a feedback system for use in controlling the steam application rate.

DESCRIPTION OF THE PREFERRED EMBODIMENT

Figure 1:
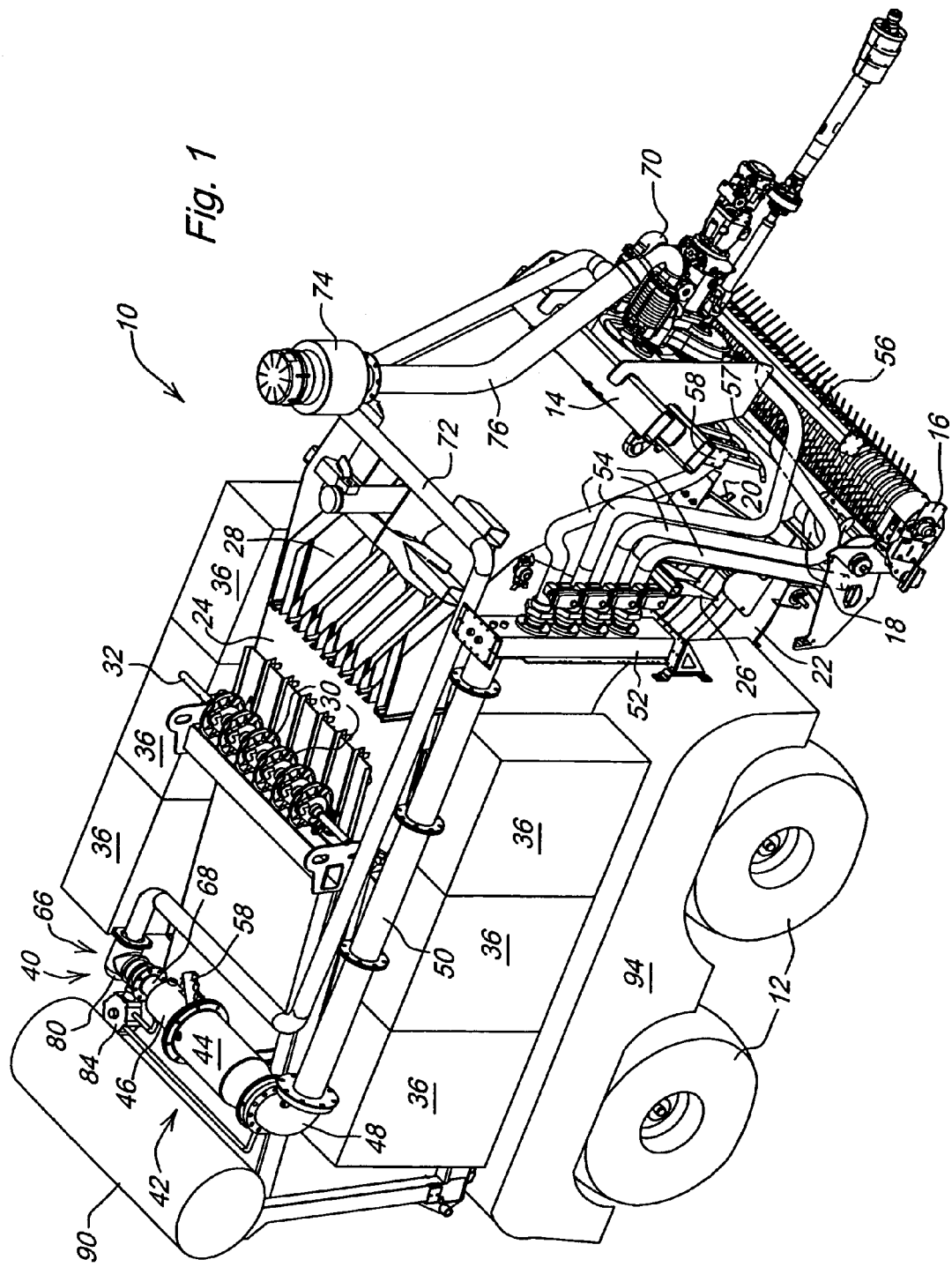
FIG. 1 is a schematic representation of a baler 10 for producing large parallelepiped bales, which is equipped with a crop re-hydration system with which the present invention is particularly adapted for use.

Referring now to FIG. 1, there is shown a large square baler 10 including a main frame (not visible) supported on a set of tandem wheels 12 for being towed across the ground by a tractor (not shown) coupled to the forward end of a draft frame (not shown) joined to, and extending forwardly from a cross beam structure 14 forming a forward end of the main frame. Suspended from a forward location of the main frame is a crop gathering pick-up 16 having a tined reel operable for elevating a windrow of crop and delivering it to a pair of stub augers 18 (only one visible) operable for narrowing the stream of crop for being fed, by a packer fork assembly 20 into an inlet of a pre-compression chamber 22 which is curved upwardly and to the rear. The pre-compression chamber 22 defines an outlet at its upper end which registers with an inlet provided at a bottom wall of a fore-and-aft extending baling chamber 24. A stuffer fork 26 is selectively operable for moving charges of pre-compressed crop from the pre-compression chamber 22 into the baling chamber 24. In a manner known in the art, the charges of crop are intermittently compressed rearwardly in the baling chamber by a plunger 28 mounted for reciprocating in a forward section of the baling chamber 24 so as to form a bale of compressed crop.

Once a bale of a pre-selected length is formed, it bound together by a plurality of strands of twine through the action of a tying system including a twine-delivery needle assembly (not visible) including a plurality of needles mounted for being swung upwardly through the baling chamber 26 from a stand-by position, so as to respectively deliver twine to a plurality of tying devices including respective knotter gears 30 mounted to a knotter shaft 32 extending across the top of the baling chamber 24. A supply of twine for delivery by the needles is provided in the form of balls of twine (not shown) contained within twine storage boxes 34 provided along opposite sides of the baler 10.

Power for driving all of the functions mentioned thus far is derived from the power take-off of the towing vehicle, which is coupled to a drive line 36 coupled to the power take-off.

Integrated into the structure of the baler 10 is a crop re-hydration system 40 including a direct-fired steam generator 42 including a steam generator body 44 supported at an upper rear region of the baling chamber 24. The steam generator body 44 has an interior which defines a combustion chamber and comprises a major cylindrical section to which a cylindrical burner-head 46 is coupled, and a conical outlet section to which one end of an elbow 48 is coupled, the other end of the elbow being coupled to a primary steam distribution tube 50 extending fore-and-aft above the right-hand twine storage boxes 36, with a static mixer (not shown) being provided in a section of the tube 50 which is adjacent the elbow 48. A forward end of the steam distribution tube 50 is coupled to a primary steam distribution manifold 52 mounted to a right-hand forward region of the baler 10. The primary steam distribution manifold 52 is, in turn, coupled by a plurality of steam distribution conduits 54, to a plurality of secondary manifolds, including a first secondary manifold 56 located above a central forward region of the pickup 16, and a second secondary manifold 57, located in a region above and between the converging augers 18. The secondary manifolds 56 and 57 distribute steam through a plurality of nozzles and are located such that steam passing through the nozzles are applied to top and bottom locations of the stream of crop being fed into the pre-compression chamber 22.

Figure 2:
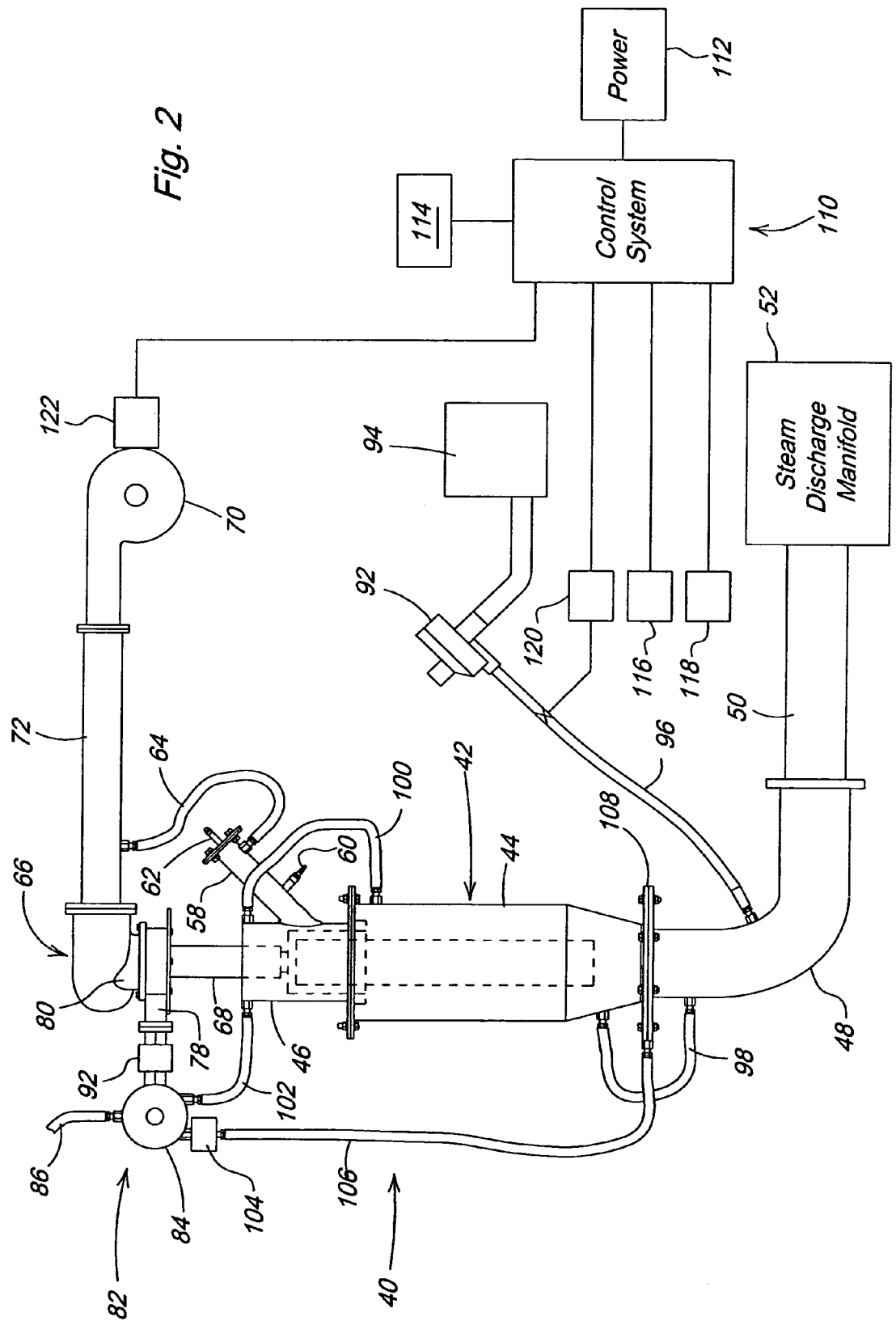
FIG. 2 is a schematic representation of the crop re-hydration system shown in FIG. 1.

Referring now also to FIG. 2, it can be seen that a pilot burner arrangement including a tube 58 is coupled to the burner-head 46 so as to project through and terminate at an interior surface of a lower region of the burner-head 46. An igniter 60, which may be a spark plug or other type of sparking device, is mounted to the tube 58 so as to be positioned to selectively create a spark at an interior location of the tube 58 for igniting a fuel/air mixture resulting when vaporized fuel enters by way of a pilot fuel inlet 62 provided in a cover at an inlet end of the tube 58, and when air enters by way of a pilot burner air line 64 coupled to an upper location of the tube 58.

A carburetor 66 has an outlet coupled to an inlet end of the burner-head 46 by a short tube 68. Coupled between a main combustion air inlet of the carburetor 66 and an output of a variable output, air pump arrangement 70 is a combustion air supply conduit 72, with the inlet of the air pump arrangement 70 being coupled to an air cleaner 74 by a clean air inlet conduit 76. The carburetor 66 also has a main combustion fuel inlet 78 coupled to an outlet end of a throttle body 80.

A fuel converter assembly 82 includes a pair of converter bodies 84 (only one visible) each having a liquid fuel inlet coupled to a fuel line 86, which, in turn, is coupled, by way of a control system (not shown), to a propane tank 90, which is carried on an upper rear region of the baling chamber 24. The converter assembly 82 includes a gaseous fuel outlet, which is coupled to the combustion fuel inlet 78 of the carburetor 66 by way of a manifold 92. A water conduit section is located in the converter assembly 82 in heat-transfer relationship to the liquid fuel located in the converter assembly and carries hot water for imparting heat to liquid propane that enters the converter assembly 82 by way of the fuel line 86 so as to convert the liquid propane to gaseous propane which exits the converter assembly 82 and is drawn into the carburetor 66 by the action of the throttle (not shown) contained in the throttle body 80. Process water, used for forming the steam generated in the steam generator body 44, is also used for heating the liquid propane that enters the fuel converter assembly 82.

Specifically, the elbow 48, steam generator body 44 and burner head 46 are each provided with a double wall construction forming a water jacket for receiving cooling water for cooling the respective parts so that they do not become overly heated by the combustion that takes place in the burner head 46 and the steam generator body 44, and by the hot gases resulting from the combustion process. This cooling water is supplied by a water pump 92 coupled for drawing water from a pair of interconnected water tanks 94 respectively located beneath the twine boxes 36 at the opposite sides of the baler 10 and at respective locations centered above the tandem wheels 12, with only the right-hand water tank 94 being visible. The water pump 92 has an outlet coupled to the water jacket of the elbow 48 by a conduit 96, which in turn is coupled to the water jacket of the steam generator body 48 by a conduit 98, which in turn is coupled to the water jacket of the burner head 46 by a conduit 100. The burner head water jacket is provided with an outlet coupled to an inlet of the fuel converter assembly 82 by a hot water feed conduit 102. This process water flows out of the fuel converter assembly 82 into a manifold 104 that, in turn, is coupled to a conduit 106 that leads to a water injection device (not shown) contained in a joint 108 between the elbow 48 and the generator body 44 and which injects the water into hot combustion gases so that the water is turned into steam. It is noted that initially only some of the water is turned into steam but that as the remaining water becomes more thoroughly mixed with the hot gases by the static mixer and also during traveling along the primary steam delivery tube 50, it too becomes steam.

An electronic control system 110 having a power source 112, such as a battery, is provided for controlling the firing rate of the direct-fired steam generator system 42. A key 114 is coupled to the control system 110 for inputting a signal representing a temperature increase range within which the temperature of a given crop being baled may be raised by the applied steam without the crop experiencing leaf shatter during the baling process and without the crop contained in the formed bale undergoing a serious degradation of color during storage. In order to determine the increase in temperature experienced by the crop during steam treatment, a first temperature sensor 116 for sensing ambient temperature is coupled for sending a signal representative of the ambient temperature to the control system 110, and a second temperature sensor 118, which may be an onboard, non-contact temperature sensor, such as an infrared sensor, for example, for sensing the internal temperature of a bale being formed after steam is applied to the crop. In order to obtain a representative internal temperature of a given bale, such an infrared sensor would be located on the exterior of the baling chamber 24 at a location conducive for the sensor 118 to "see" the front of a bale being formed, with the sensor being triggered to take a temperature reading when the bale is about half the length of a completed bale. Such a length could be approximated by a counter which counts the number of compression strokes performed by the plunger 28 in creating a bale and which sends a signal for triggering operation of the temperature sensor 118 when the number of strokes reaches that for making half of a completed bale. The steam application rate is here varied by controlling one or more of the amount of process water provided for being changed to steam, and the amount of air provided for combustion in the combustion chamber. Specifically, the amount of process water delivered by the pump 92 is controlled by a solenoid operated control valve 120 that is coupled into the water line 96 and connected to the control system 110. The amount of air supplied for combustion is controlled by a speed controller 122 associated with the pump 70 and coupled to the control system 110, with it being noted that the amount of fuel mixed for combustion is automatically regulated in accordance with the amount of air by the action of the throttle contained within the throttle body 80, since the throttle body acts to ensure that a stoichiometric mixture of gas and air is present for combustion.

While the temperature sensors 116 and 118 are here shown as being coupled to the control system 110, so as to be used as feedback for an automatic control system, it is to be noted that the invention in its basic form could be manually performed. Specifically, in lieu of an ambient temperature sensor 116 that sends a signal, the operator could merely use a thermometer to determine the ambient temperature, and in lieu of an onboard, non-contact temperature sensor 118, which senses internal bale temperature, a manually operable temperature probe could be inserted into a completed bale after the bale has been discharged, but prior to the temperature of the bale changing any appreciable amount. The operator would then determine the difference between the ambient and internal bale temperatures and compare this difference with a known permissible change in temperature to see if any adjustment to the steam rate is required. If so, then the changes in water flow and/or air flow can be manually effected so as to appropriately change the steam application rate. As long as the ambient temperature does not change a significant amount, the settings of the water and air flows may be maintained once set for effecting a steam application rate which results in the temperature increase of the crop due to steam application being within the range known to produce bales of good quality crop. Further, it is to be noted that while the preferred steam generator system includes a direct-fired steam generator, the increase in the temperature of the treated crop can be used for controlling other steam generator systems as well.

Figure 3:
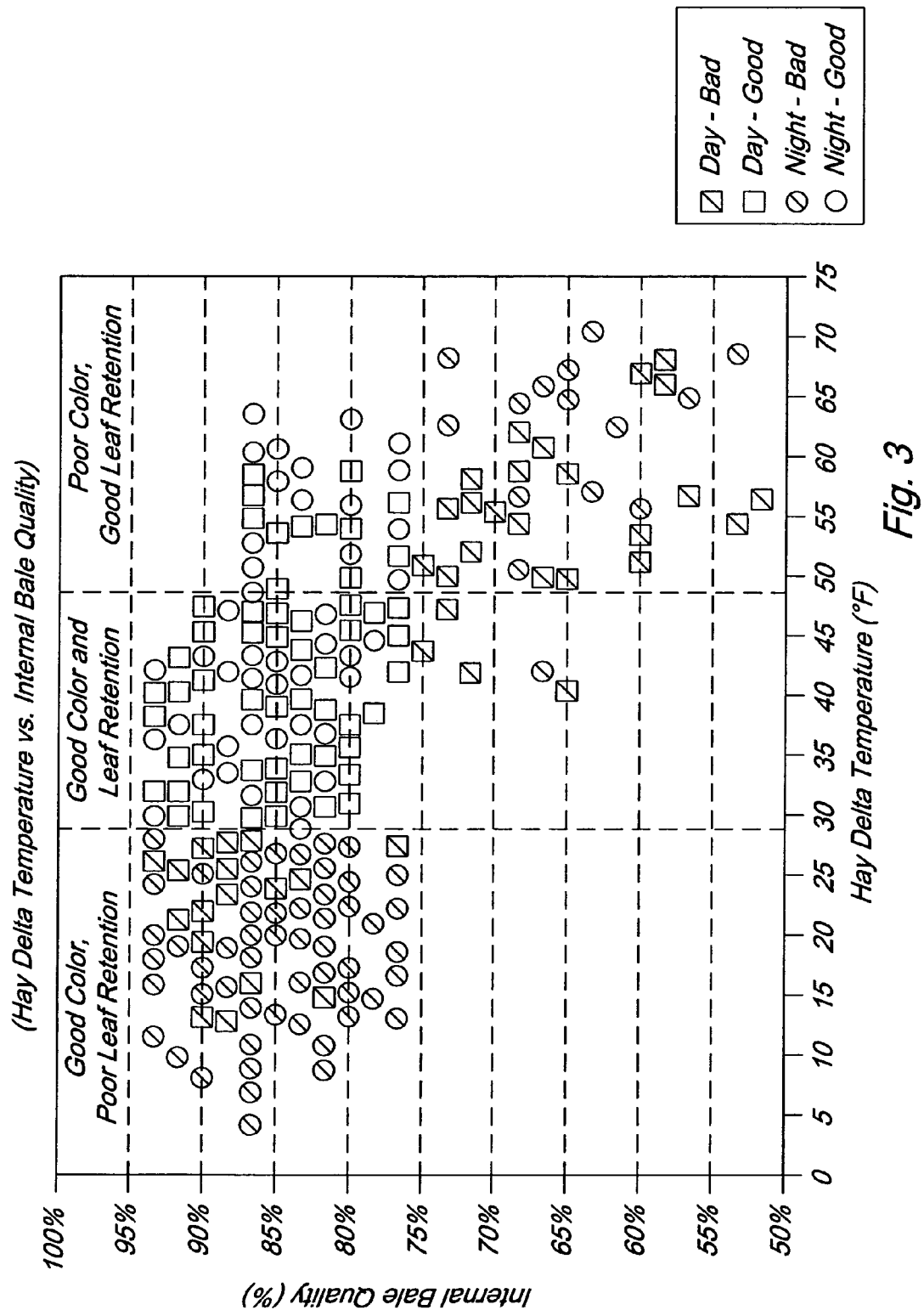
FIG. 3 is data plot showing internal bale quality as a function of the difference between ambient temperature and the internal temperature of a bale before any appreciable temperature loss after being formed using steam re-hydrated crop, including a combined data set for bales made both at night and during the day.

Referring now to FIG. 3, there is shown a plot of data obtained relating the quality of hay found in stored bales to the temperature rise ($\Delta T$) that the hay had undergone due to being treated with steam during the baling process, with each circle representing one bale made at night, and with each square representing one bale made during the day. The change in temperature for a given bale was obtained by measuring the ambient temperature and by sticking a temperature sensing probe into the center of the bale, with the difference between these temperatures being the "Hay Delta Temperature" plotted on the data plot. The quality of the hay was determined by inspecting the hay within a bale and looking at leaf retention and at the color of the hay within the bales. A green color is desired since it indicates that hay has not deteriorated within the bale. A color other than green indicates hay that was baled too wet and/or too hot and has molded or has otherwise undergone a serious loss in nutrient value. Furthermore, if the bale contained at least 75% good hay, it was considered acceptable.

Three columns are provided, which, from left to right, are labeled "Good Color, Poor Leaf Retention", "Good Color and Leaf Retention" and "Poor Color, Good Leaf Retention". The measured $\Delta T$ of the bales in the first column are in a range of approximately 10° F. to about 29° F., the measured $\Delta T$ of the bales in the middle column are in the range of approximately 29° F. to about 48° F. and the measured $\Delta T$ of the bales in the last column are in the range of from approximately 48° F. to 71° F.

Because of the leaf loss experienced by the hay contained in the bales plotted in the first column, it is clear that steam rate application is not sufficient to re-hydrate the dry hay for any $\Delta T$ less than about 29° F. As concerns the middle column, for bales having a $\Delta T$ greater than 29° F. but less than 48° F., all of the bales, except for five, in the $\Delta T$ range between 39° F. and 48° F. had good color and leaf retention. The random nature of the data related to these five bales led to them being ignored in the assessment of bale quality. Concerning the last column, even though the bales had good leaf retention, more than half of the bales created had a poor color, so that it was concluded that poor bales would result if hay undergoes a $\Delta T$ in excess of about 48° F.

Assuming that an operator desires to manually control the steam generator system 40 for adjusting the steam application rate in order to produce bales of good quality, the operator will consult a data table to find out the appropriate $\Delta T$ range for the crop that is to be baled. Then, at the beginning of a day of baling, the operator will use a thermometer to determine the ambient temperature. The steam generator system 40 will be put into operation and the baler 10 will be operated to produce a bale, which is discharged onto the ground. Before the bale has undergone a significant temperature change, the operator will insert a temperature sensor, in the form of a probe, into the center of the bale to obtain the internal bale temperature. The operator will calculate the difference between the internal bale temperature and the ambient temperature to arrive at the temperature increase caused by applying steam to the crop during the baling process. If this temperature increase is within the permissible $\Delta T$ range found to be suitable for producing good quality bales, the operator will continue baling without changing the steam rate application. If the temperature increase is outside the permissible $\Delta T$ range, the operator will manually adjust one or the other, or both, the speed of the air pump 70 and water metering valve 120. will use the key 114 to input the permissible $\Delta T$ range found to be suitable for producing good quality bales containing the crop to be baled. Assuming this crop to be alfalfa hay, the $\Delta T$ range input into memory will be from about 29° F. to about 48° F. An ambient temperature sensor 116 will send a signal representing ambient temperature to the control system 110, or this temperature may be obtained by the operator and keyed into the memory of the control system 110. After the steam generator system 40 is put into operation, the baler 10 will be put into operation and a bale will be produced. If the temperature sensor 118 is in the form of a manually operable probe, it will be inserted into the bale after it has been discharged from the baler, before the temperature of the bale has changed appreciably. This the operator will signal representing the steam temperature will be sent to the control system 110 by the sensor 118. The control system 110 will act to compute the difference between steam and ambient temperatures to arrive at an actual $\Delta T$. The control system 110 determines if this $\Delta T$ is within the $\Delta T$ range that was put into memory by the key 114. If the actual $\Delta T$ is less than 29° F., then the control system 110 will act to cause the water control valve 120 to be opened and the blower speed to be increased by small amounts until the desired the actual $\Delta T$ falls within the preset range. If the actual $\Delta T$ is greater than 48° F., then the control system 110 will operate to cause the water control valve 120 to open to increase the amount of water so that the temperature of the generated steam is lowered. If this fails to correct the steam temperature output to the desired temperature, then the control system 110 will also act through the controller 122 to lower the speed of the blower 70.

Assuming that an operator desires to manually control the steam generator system 40 for adjusting the steam application rate in order to produce bales of good quality, the operator will consult a data table to find out the appropriate $\Delta T$ range for the crop that is to be baled. Then, at the beginning of a day of baling, the operator will use a thermometer to determine the ambient temperature. The steam generator system 40 will be put into operation and the baler 10 will be operated to produce a bale, which is discharged onto the ground. Before the bale has undergone a significant temperature change, the operator will insert a temperature sensor, in the form of a probe, into the center of the bale to obtain the internal bale temperature. The operator will calculate the difference between the internal bale temperature and the ambient temperature to arrive at the temperature increase caused by applying steam to the crop during the baling process. If this temperature increase is within the permissible $\Delta T$ range found to be suitable for producing good quality bales, the operator will continue baling without changing the steam rate application. If the temperature increase is outside the permissible $\Delta T$ range, the operator will manually adjust one or the other, or both, the speed of the air pump 70 and water metering valve 120 in order to alter the steam firing rate in order to bring the $\Delta T$ within the permissible range.

It is to be noted that while the steam generator system 40 is here disclosed as including a direct-fired steam generator 42, that any other type of steam generator may be controlled using the discovery of the present invention, namely, that the $\Delta T$ of the steam treated crop must be kept within a predetermined range in order to ensure that the crop contained in the bales will be of good quality for a reasonable storage time. Furthermore, while the control system 110 automatically controls the steam generator so as to maintain the $\Delta T$ of the steam treated crop within a predetermined range, a control system could be set up so as to display the actual $\Delta T$ to the operator, who would manually control the steam generator to arrive at a $\Delta T$ within the permissible temperature range known to the operator as being suitable for creating bales having crop of satisfactory quality.

Having described the preferred embodiment, it will become apparent that various modifications can be made without departing from the scope of the invention as defined in the accompanying claims.

The invention claimed is:

1. A method for re-hydrating crop with steam during the baling process, comprising the steps of:
 a) measuring the temperature of the crop to be baled immediately prior to being treated with steam;
 b) creating and delivering steam to said crop to be baled;
 c) measuring the temperature of said crop after being treated with steam before any appreciable temperature change occurs;
 d) determining the difference between the temperatures measured in steps a) and c);
 e) comparing said difference with a desired range of differences known to result in bales of good quality; and
 f) adjusting, if necessary, said creating and delivering of said steam so as to bring said difference between said temperatures measured in steps a) and c) to a value within said desired range of differences.

2. The method, as defined in claim 1, wherein ambient temperature is considered to be said temperature of said crop to be baled.

3. A method of producing bales containing good quality crop from dry crop which is re-hydrated with steam just prior to being baled, comprising:
 a) establishing a desired range of temperature increase that a given crop can undergo, when being re-hydrated with steam, without sustaining a loss in quality;
 b) re-hydrating said given crop with steam just prior to baling;
 c) determining an actual temperature increase of said given crop after re-hydrating said crop;
 d) determining whether said actual temperature increase falls within said desired range of temperature increase, and, in the event said actual temperature increase falls outside said desired range of temperature increase,
 e) controlling re-hydrating said crop so as to bring said actual temperature increase within said desired range of temperature increase.

\* \* \* \* \*